Patented Sept. 29, 1942

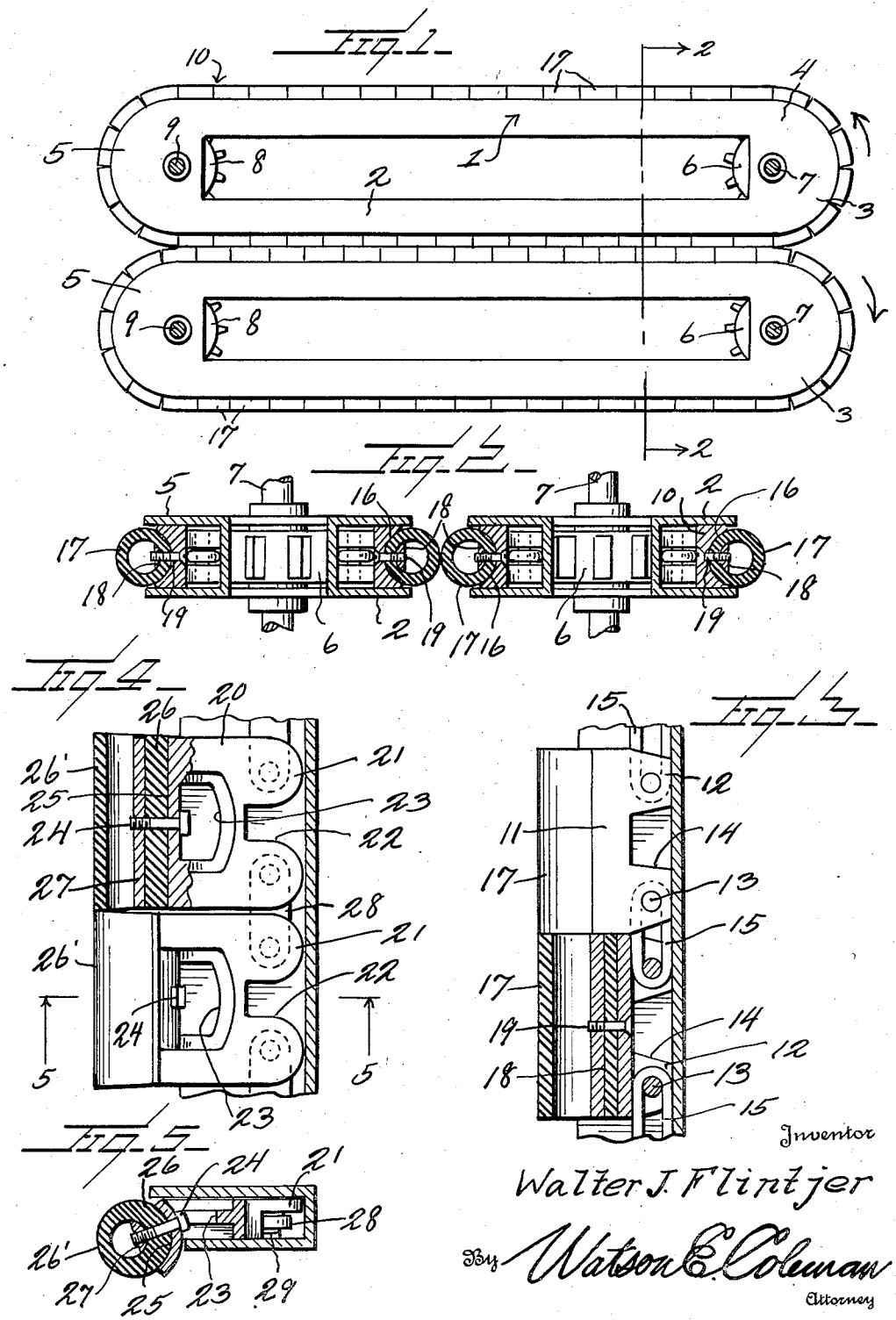

2,297,296

UNITED STATES PATENT OFFICE 2,297,296

CONVEYER

Walter J. Flintjer, Cheyenne, Wyo.

Application March 27, 1941, Serial No. 385,552

3 Claims. (Cl. 198—162)

This invention relates generally to improvements in conveyer structures and more particularly to an improved form of endless chain or unit forming a part of such conveyer and the subject matter of the present application is in part divided out of application Ser. No. 287,420, filed July 29, 1939, and in part divided out of application Ser. No. 380,549, filed February 25, 1941.

The present conveyer structure is designed primarily for use in a beet harvesting machine but its construction and design is such that it may be used with advantage in other machines or in any situation where an article is to be gripped to be carried from one point to another, and a principal object of the present invention is to provide such a conveyer with a novel and improved form of endless chain element having yieldable grippers and having a form by which it may be readily engaged by cogs of a driving wheel.

Another object of the invention is to provide an endless chain unit for a conveyer structure which is made up of a plurality of articulated bodies or castings, each of which carries a yieldable gripping member, the gripping members of the coupled bodies being assembled to form a complete endless articulated gripper which in cooperation with another similarly formed gripper provide a means for grasping a body such as the top of a beet, and carrying the same from one point to another.

Still another object of the invention is to provide in a conveyer structure employing a pair of cooperatively associated endless units, an endless unit comprising a series of hingedly coupled members, each of which carries a tubular gripper which cooperates with grippers of the coacting endless unit for the grasping of beet tops or other bodies to be conveyed, the said tubular grippers being relatively thin along their outer sides whereby a relatively soft gripping action is obtained which, while effective to lift and carry a beet by its top or any other similar article, is not strong enough to crush such article.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in plan of a conveyer constructed in accordance with the present invention.

Fig. 2 is a section on the line 2—2 of Fig. 1.

Fig. 3 is a detail view partly in elevation and partly in section of elements of a gripper unit, as illustrated in Fig. 2.

Fig. 4 is a detail view of a modified form of gripper unit element.

Fig. 5 is a sectional view on the line 5—5 of Fig. 4.

Referring now more particularly to the drawing, there is shown in Fig. 1, in top plan, a conveyer structure constructed in accordance with the present invention, without illustrating any supporting means or operating means therefor, it being understood that this structure while primarily intended or designed to be used in connection with a beet harvesting machine such as is illustrated in both of the previously referred to pending applications, may be used in connection with any suitable type of supporting structure and operated by any suitable type of driving means. For this reason, no supporting structure or driving means has been illustrated nor is it thought necessary to describe the same.

In accordance with the present invention, the conveyer comprises two similar or duplicate structures which are indicated generally by the numeral 1, and which are arranged in side by side relation for cooperative action. Each of these structures comprises two endless tracks or channels 2 which are of substantially U-shaped cross-section and which are arranged so that one side of one track is disposed with its open face parallel with and in opposed relation to the open face of a side of the other endless track. At each end of each of the endless tracks there are formed integrally with the semi-circular end portions thereof, which are indicated by the numeral 3, the top and bottom plates 4 and 5. The plates 4 may be located at the discharge end of the conveyer and the plates 5 at the entrance end thereof, and there is pivotally supported between each pair of plates 4, a toothed wheel 6 mounted upon a supporting shaft 7 which is concentric with the adjacent semi-circular portion 3 of the track. This wheel 6 has a portion of its periphery extended into the adjacent semi-circular part of the track for engagement with the endless chain unit hereinafter described. It will be understood that by means of the shafts 7, the necessary rotary movement may be imparted to the endless chain units of the conveyer.

At the other or receiving end of the conveyer there is mounted between the vertically spaced plates 5 of each of the structures 1, a toothed idler wheel 8 pivoted at 9, as shown, for carrying the adjacent endless chain unit around the forward end of the structure.

The endless chain units of the two structures making up the complete conveyer are indicated generally by the numeral 10. Each of these units comprises a series of elongated bodies 11, each of which is cast or otherwise formed to have at each end and upon one side thereof the pair of spaced ears 12 across and between which extends a pin 13. The space 14 between the two pairs of ears 12 of each body receives the teeth of the sprocket wheels or toothed wheels 6 and 8, which are at the forward and rear ends of the structures. The bodies 11 are connected together by coupling links 15 which have their ends disposed between the pairs of ears 12 and have the pins 13 passed therethrough as is most clearly shown in Fig. 3, to form the endless chain unit. The bodies 11 move or slide in the channel tracks 2, the ends of the ears 12 bearing against the inner or back wall of the channel, as is shown in Fig. 2.

The outer sides of the bodies 11 are longitudinally channeled or recessed, as indicated at 16, and extending lengthwise of each body 11 and lying within the channel or recess 16 is a short tubular body 17 formed of rubber or other suitable resilient material. These tubular bodies 17 are maintained in place by the inserted clamp bars 18 which extend longitudinally therethrough and which are joined to the adjacent body 11 by a pin or screw 19.

The tubular bodies 17 are of such length that they come into close end to end relation, particularly where the bodies are passing along the straight sides of the channeled guide and they, therefore, form a substantially continuous tubular gripping strand, each of the tubular bodies forming what might be termed a gripping element.

As shown in Fig. 2, the depth of the endless guide channel is such that the major portion of each tubular body will extend from the channel and thus when the tubular bodies travel along the inner or opposing sides of the structures 1, these tubular bodies of one endless chain unit will come into parallel abutting relation with the inner run of the tubular bodies of the other chain unit. The endless chain units are rotated so that the joining together of the same occurs at the receiving end or forward end of the conveyer, so that if the conveyer is used in a beet harvesting machine, for example, and the forward end is in the proper position with respect to the ground, the tops of the beets will be received between the inner runs of the gripping strands and will be carried through the length of the structure to be released at the opposite end. Where the present conveyer is used in a beet harvester, it will, of course, be understood that the forward end will be in close proximity to the ground to engage or take hold of the beet tops while the rear end may be at a raised position so as to discharge the beets into a receiver.

As previously stated, the teeth of the driven toothed or sprocket wheels 6 engage in the recesses 14 of the bodies 11 so as to impart the necessary driving movement to the endless chains, in the direction of the arrows in Fig. 1.

In Fig. 4, there is illustrated a slightly modified construction of an endless chain link. In this modified link construction the body of the link is indicated generally by the numeral 20. At the rear side of the link body and adjacent each end there is formed a single ear 21, these ears being spaced apart to provide an intermediate notch or recess 22 for the reception of a tooth of a driving toothed wheel or sprocket wheel. At the central part of the body there is formed a transverse opening 23 and extending through the body from this opening is a pin or bolt 24 which enters the longitudinally extending channel 25, which is formed upon the opposite side of the body from the ears 21. Lying in this channel is a tubular rubber gripping element 26 similar to the gripping element 17 and this is maintained in place by a securing bar 27 which passes longitudinally through the tubular body and is engaged by the pin or screw 24 to clamp the tubular gripping element firmly in the channel 25.

It was stated that the tubular gripping element 26 is substantially the same as the element 17. However, the distinction between this element and the element 17 is that the element 26 is provided with a relatively thin wall along the side remote from the part engaged by the clamping bar 27, as is indicated at 26'. This construction provides for extra strength in the gripping element along the part which is clamped to the body 20 and a softness or yieldability along the opposite side which gives to the opposing endless chain units a soft gripping action, which when the devices are used in the harvesting of beets or other vegetables where the tops must be grasped, facilitates the grasping of such tops without danger of mashing the same and thus causing the conveyer to lose its grip upon the vegetable.

The links of the endless chain units are coupled together by the short link bars 28, each of which has an aperture in each of its ends for the reception of a pivot pin 29 carried by an ear 21, the link bars being retained upon the pins by cotter keys or in any other suitable manner.

From the foregoing, it will be readily apparent that there has been herein disclosed a conveyer structure in which the cooperating endless chains are of novel construction and provide the continuously moving gripping means which has the desired flexibility to enable it to pass readily around the ends of the supporting structure without subjecting it to the strains and wear which would result if such endless chain structure were made of a single or continuous tubular body. Also it will be readily apparent that by the provision of the endless units in the form of articulated bodies, each carrying a short tubular gripping element, the necessary repairs may be made to portions of the endless unit without having to replace the entire unit. There is also obtained a superior gripping action by the provision of the individual gripper elements with thin outer wall portions since this makes it possible to use the conveyer for the handling of delicate or easily crushed bodies which could not be handled with conveyers in which the grippers are of hard or unyielding material.

What is claimed is:

1. An endless gripper structure for a conveyer, comprising a plurality of elongated bodies arranged in end to end relation and each having a pair of laterally extending ears upon one longitudinal side and a channel along the opposite longitudinal side directed away from said ears, a coupling link between each ear of one body and the adjacent ear of an adjacent body, and a tubular body disposed in the channel of the first body and secured therein and having the length of the portion of its wall opposite from the channel of materially less thickness than the portion of the wall lying in the channel.

2. As an element of an endless conveyer chain, an elongated body having a channel extending lengthwise of one side, a pair of spaced ears projecting laterally from the side opposite the channel, the space between the ears being designed to receive a sprocket wheel tooth, said ears being adapted each for pivotal connection with a link element, a tubular rubber body of the same length as the first body and lying in said channel, a clamp plate extending thru the tubular body, and a securing pin extending thru the two bodies to and connected with said plate.

3. An element as set forth in claim 2 in which said ears are of a thickness not greater than half the thickness of the first body and have one side face substantially coplanar with a side of the first body.

WALTER J. FLINTJER.